UNITED STATES PATENT OFFICE.

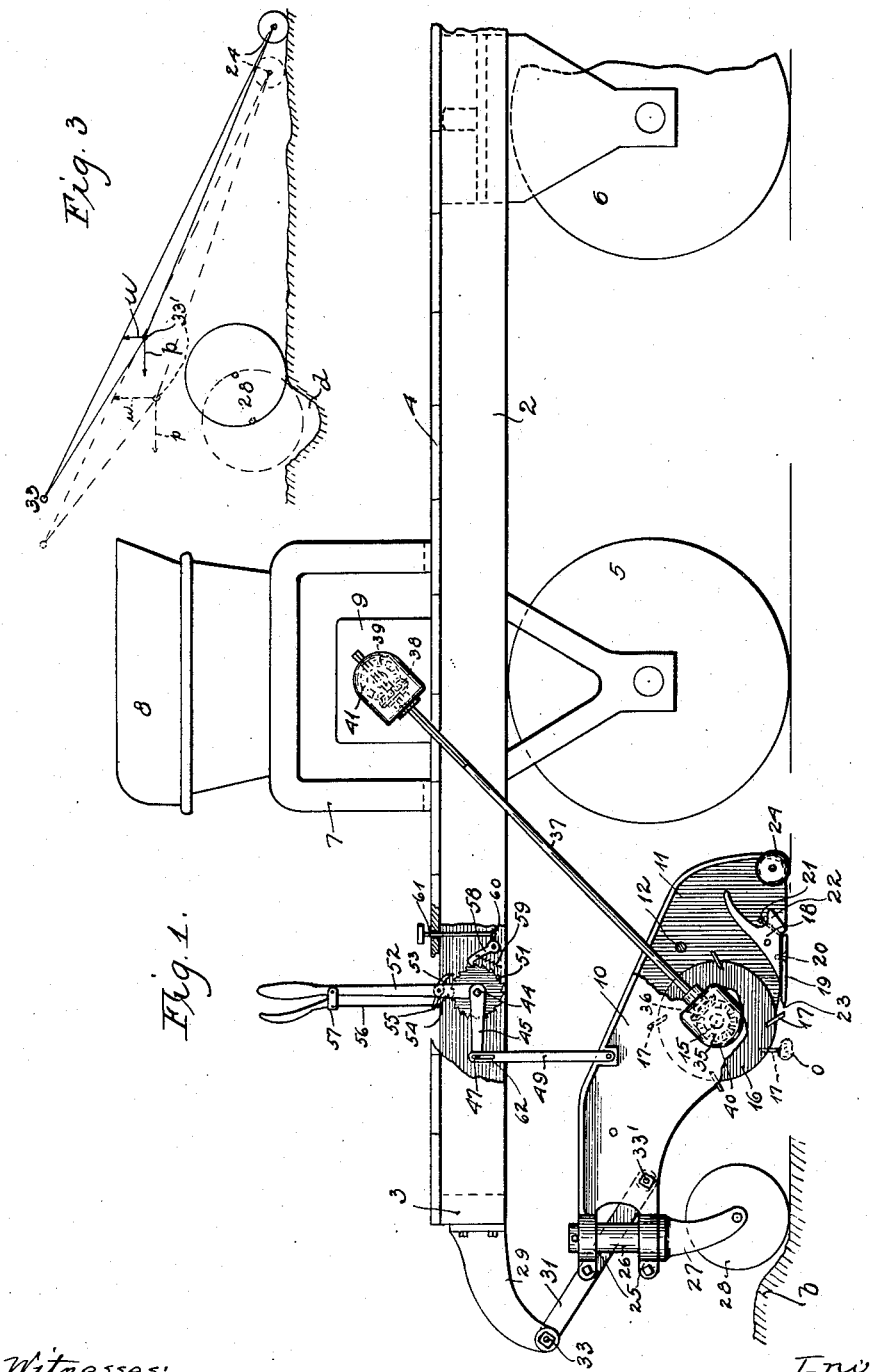

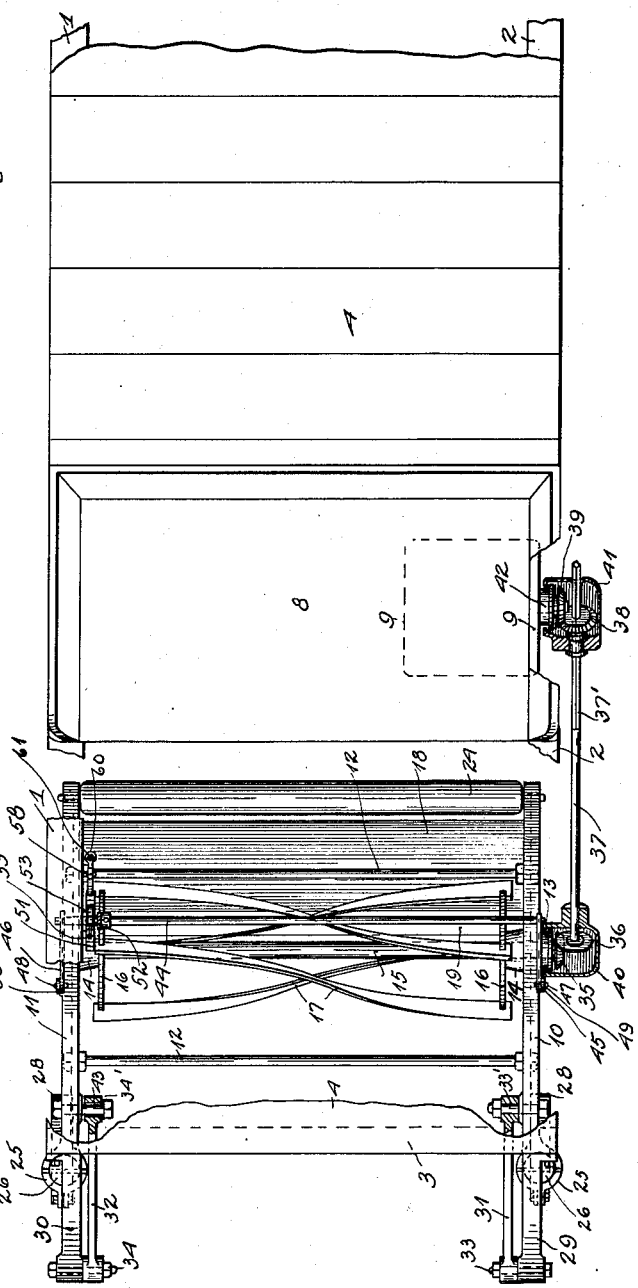

HERBERT S. MUSTIN, OF CHICAGO, ILLINOIS, ASSIGNOR TO THE AUSTIN MANUFACTURING COMPANY, OF CHICAGO, ILLINOIS, A CORPORATION OF ILLINOIS.

POWER-DRIVEN LAWN-MOWER.

1,014,663.     Specification of Letters Patent.     Patented Jan. 16, 1912.

Application filed February 16, 1911. Serial No. 608,970.

*To all whom it may concern:*

Be it known that I, HERBERT S. MUSTIN, a resident of Chicago, in the county of Cook and State of Illinois, have invented certain new and useful Improvements in Power-Driven Lawn-Mowers, of which the following is a full, clear, and precise specification.

My invention relates to power driven lawn mowers, and involves several important features of construction, arrangement and operation.

My invention concerns particularly that class of power driven lawn mowers in which the vehicle frame supports the driving engine and with the front part of which the mower or cutting frame is associated.

In prior machines of this class the mowing or cutting frame is connected with the vehicle to be pushed along, and this mode of propulsion has many disadvantages. The mowing or cutting frame is usually supported at its front end on casters and at its rear end by a guard roller, and the push connection extends from the frame rearwardly to the vehicle body so that when the casters encounter an obstruction they will have a tendency to dig or burrow into the earth owing to such push connection.

One of the salient objects of my invention is to eliminate such push connection and to provide a pull connection between the vehicle part and the mower frame, the mower frame remaining at the front end of the vehicle, and the object is further, to increase the efficiency of this pull connection by providing for an upward vertical force component for the pull mechanism, which component is effective and which operates to relieve the casters and guard roller from the entire weight of the mower frame, and particularly to aid the casters in surmounting obstacles and to prevent digging thereof into the ground, the arrangement being such that the vertical component increases as the caster end of the mower frame descends. This arrangement eliminates a great part of the strains on the mower part due to uneven ground.

Another salient object of my invention is to associate with the pull arrangement such connection of the pull mechanism with the mower frame and with the vehicle body as will assure to the mower frame the greatest freedom of movement independent of the vehicle frame so that it can follow the ground without undue strains.

Another salient object of my invention is to combine with the pull propulsion mechanism a rotary cutting frame on which the wipers or knives are set at angles with radii of the rotary frame, so that when the blades approach the ground they are substantially vertical. With this arrangement any obstructions will be struck edge foremost by the blades instead of by the sides of the blades, as in prior constructions. As the mower frame has the free bodily movement above referred to, such striking of obstructions by the blades will tend to raise the mower frame over the obstructions, this being aided by the upward component referred to.

My invention also includes improved adjusting mechanism for the mower frame by means of which it may be bodily raised and adjusted vertically, the connection between the mower frame and the adjusting mechanism being such as not to interfere with the free bodily movement of the mower frame during cutting operations. The driving connection between the vehicle engine and the mower frame is flexible so as not to impede the free movement of the mower frame.

All the various features of my invention are brought out more clearly in detail in the following specification and illustrated on the accompanying drawings, in which drawings—

Figure 1 is an elevation view of a mowing machine with parts broken away to more clearly illustrate the construction and operation, Fig. 2 is a plan view of the machine with parts broken away to more clearly illustrate the construction and operation, and Fig. 3 is a diagrammatic view for illustrating the effect of the vertical component referred to.

The vehicle frame may be of any suitable construction, and is shown as comprising side beams 1 and 2, a front cross beam 3, and a floor 4, the frame being mounted on a main roller 5 and a steering roller 6. On the frame is also mounted a supporting structure 7 carrying a seat 8, and a suitable driving engine 9 is conveniently mounted under the seat. The mower frame is situated in advance of the main roller 5 and comprises side plates 10 and 11 spaced apart by cross bars 12, hubs 13 and 14 disposed at intermediate points on the side plates journaling a shaft 15 which supports disks 16, between which extend spiral blades or wipers 17, the shaft, disks and blades constituting the rotary cutting frame. Spanning between the side plates to the rear and below the rotary cutter frame is the cutter bar 18 supporting on its base the knife bar 19, this knife bar being pivoted on screws 20 and being adjustable by means of set screws 21 passing through the heel 22 of the cutter bar and engaging with the rear upper edge of the knife bar, the point 23 of the knife bar coöperating with the blades 17 to form the cutting line. The rear lower corners of the side frames pivot the guard roller 24. The front ends of the side plates expand to form bearing collars 25 for journaling the stems 26 of caster frames 27 which pivot casters 28. Extending forwardly and downwardly from the front of the vehicle frame at the sides thereof are the pull arms 29 and 30, and connecting between the ends of these arms and the side plates 10 and 11 are the pull links 31 and 32, the pivots 33 and 34 allowing free vertical swing of the links. The pivot connections 33' and 34' of the links with the side plates are below the plane passing through the pivot centers of the guard roller and the pivots 33 and 34, so that besides having a horizontal component $p$ at the pivots 33', 34' we have also a vertical upward component $u$ (Fig. 3). With this arrangement, when the machine travels, the upward component relieves the casters of a considerable part of the weight of the mower frame, and the mower frame will travel more uniformly over uneven ground, the casters skimming over the lesser bumps and irregularities. If larger abrupt rises or ridges, such as $b$ are encountered, the upward component will assist the casters in mounting them. With prior machines which have the push connection between the mower frame and the vehicle this would not be the case, and the casters would dig into the obstruction, and the cutting parts of the mower would then encounter and dig into the obstruction to the detriment of these cutting parts. Furthermore, this digging in of the casters and the cutting parts adds to the propulsion power required. In my arrangement the vertical component together with the pull of the mower frame enables the machine to be operated more uniformly and saves the cutting parts and prevents marring of the lawn. Should the caster wheels encounter a depression $d$, (Fig. 3) such as a wagon rut, they will tend to drop therein, and if the casters should drop, the upward component $u$ is immediately increased, as shown in dotted lines, Fig. 3, the result being that the mower frame is immediately lifted toward normal position and the casters are guided smoothly over the obstruction without digging into the ground, and the cutting parts will be prevented from cutting into the ground. As a result, therefore, of the pull connecting mechanism and the pivot center arrangement thereof, the mower frame will travel more uniformly in the general direction of the ground independently of sudden bumps or depressions, and the ground will not be dug up by the casters and the cutting parts, the smoothing out and leveling of the obstructions being accomplished by the heavy rollers 5 and 6 supporting the vehicle.

The rotary cutting frame should be connected with the engine 9 by transmission mechanism which is sufficiently flexible to allow the mower frame to adjust itself freely to the ground. A preferred transmission mechanism is that disclosed in my copending application, Serial No. 532,202, filed December 9th, 1909.

As shown, the shaft 15 of the cutting structure terminates in a bevel gear 35 which meshes with bevel pinion 36 secured to the lower end of shaft 37, whose upper polygonal end 37' is slidable through a bevel gear 38 which meshes with the bevel pinion 39 secured to the engine shaft, the shaft 37 being thus free to slide through the gear 38 but at all times being rotated by said gear when the engine is running. A housing 40 accommodates gears 35 and 36 and has lost motion pivotal connection with the outer end of hub 13. A housing 41 accommodates gears 38 and 39 and has lost motion pivotal connection with a hub 42 extending from the engine frame. This form of transmission mechanism maintains efficient driving connection between the engine and rotating cutter frame under all conditions, and at the same time allows the mower frame to adjust itself freely to the ground.

From the description thus far it will be seen that the mower frame is free to rock and to adjust itself longitudinally independently of the vehicle body. Provision must also be made for allowing the mower frame to rock and adjust itself in a transverse direction to follow the ground. For this purpose both pull links 31 and 32 may have lost motion connection with the mower frame side plates, but preferably this lost motion is provided only for the link 32 connecting with the mower frame opposite the drive end thereof.

Provision must also be made for raising the mower frame when obstructions are encountered over which the mower frame could not pass. A shaft 44 extends transversely across the vehicle body and is journaled in the side beams 1 and 2 thereof above the mower frame, the ends of the shaft carrying lift arms 45 and 46 having pins 47 and 48 at their ends pivotally receiving the upper ends of links 49 and 50 whose lower ends pivot to the side plates of the mower frame. Secured to the shaft is a ratchet wheels 51, and pivoted to the shaft adjacent the wheel is a lever 52 pivoting a pawl 53 whose front end is normally held away from the wheel by a spring 54 connecting between the tail 55 of the pawl and the lever. A rod 56 connects the tail with the ends of a grip 57 pivoted adjacent the upper end of lever 52 in such manner that when swung toward the lever the pawl will be rotated into engagement with the ratchet wheel. A detent pawl 58 which may conveniently be pivoted to the side beam 1 is held to the ratchet wheel by a spring 59, its tail 60 being engaged by a foot pin 61 extending through the floor of the vehicle, depression of the pin causing the detent pawl to be swung away from the ratchet wheel. By swinging the lever and adjusting the pawl 53 the ratchet wheel and shaft can be rotated to swing the lift arms upwardly to raise the mower frame, the detent pawl holding the parts in adjusted position. Thus, when an obstruction is encountered which the mower frame can not surmount the mower frame can be quickly raised until the obstruction is passed, whereupon release of the lever and depression of the foot pin allow the mower frame to drop back to normal position. In order that the perfect freedom of movement of the mower frame under operating conditions is not impaired, the pins 47 and 48 on the lift arms engage in slots 62 in the links 49 and 50. This slot and pin connection allows the mower frame to move and adjust itself independently of the lifting mechanism, but at the same time, when an unsurmountable obstruction or obstacle is encountered the mower frame can be quickly raised.

I find that angularly set blades on the rotary cutter frame are particularly advantageous in my construction in combination with the pull arrangement. Obstacles o such as sticks, stones, or the like are frequently encountered, and if the blades are set in radial planes these obstacles will be struck by the flat side of the blades and will be carried or scooped against the cutter bar blade with harmful results. By setting the blades at angles to radii of the rotary cutter frame these obstacles will be struck by the blades when the blades are substantially in a vertical plane, and the mower frame being suspended to move bodily freely in vertical direction will be lifted upon such engagement of the blades with the obstacle, the result being that the cutting parts are carried over the obstacle and will not be injured. The pull component is particularly effective in assisting such upward bodily movement of the mower frame.

I, therefore, produce a mowing machine of the class described, in which the mower frame is adapted to follow efficiently the general direction of the ground and which is assisted by the propulsion mechanism to overcome obstacles without injury to the cutting parts or marring of the ground.

I do not desire to be limited to the precise construction, arrangement and operation which I have disclosed, as changes and modifications are possible which would still come within the scope of my invention, and I, therefore, desire to secure the following claims by Letters Patent:

1. In a power driven lawn mowing machine, the combination of the machine body and a driving engine mounted thereon, a cutting structure below said body comprising side frames and a rotary cutting frame journaled thereon, transmission mechanism between said engine and rotary cutting frame, brackets extending forwardly and downwardly from the machine body in advance of the cutting frame, links pivoted to the lower ends of said brackets and to the front ends of the side frames of the cutting structure, said cutting structure being normally supported entirely on the ground and said links serving, when the machine is driven, to pull the cutting structure forwardly and at the same time to exert upward lift on the front ends of the cutting structure to prevent the front end thereof from dropping, due to uneven ground and thereby preventing the cutting frame from digging into the ground.

2. In a power driven lawn mowing machine, the combination of the machine body and a driving engine mounted thereon, a cutting structure comprising side frames and a rotary cutting frame journaled thereon, transmission mechanism between said engine and rotary cutting frame, and pull links having pivotal connection with said cutting structure and having pivotal connection with said machine body in advance of said cutting structure, said pull links exerting both forward pull and upward lift on the cutting structure when the machine is in operation.

3. In a power driven mowing machine, the combination of the machine body and a driving engine mounted thereon, a cutting structure below the machine body and comprising side plates and a rotary cutting frame journaled thereon, supporting casters journaled to the front end of said cutting structure, a guard roller at the rear end of said cutting structure, said casters and guard roller supporting the cutting structure on the ground, pull links pivoted to the machine body and having pivotal connection with the cutting structure in advance of the vertical plane passing through the center of gravity of the cutting structure, the pivotal connection of the pull links with the cutting structure being below the plane passing through the guard roller axis and the pivotal connection of the links with the machine body whereby upon forward movement of the machine the cutting structure will be pulled along the ground and upward lifting force exerted thereon, and transmission mechanism connecting said engine with the rotary cutting frame.

In witness whereof, I hereunto subscribe my name this 13th day of February, A. D., 1911.

HERBERT S. MUSTIN.

Witnesses:
CHARLES J. SCHMIDT,
NELLIE B. DEARBORN.